Jan. 14, 1969 R. C. JENSEN 3,422,428
MOVING-TARGET-RESPONSIVE RADAR SYSTEM
Filed Sept. 15, 1953
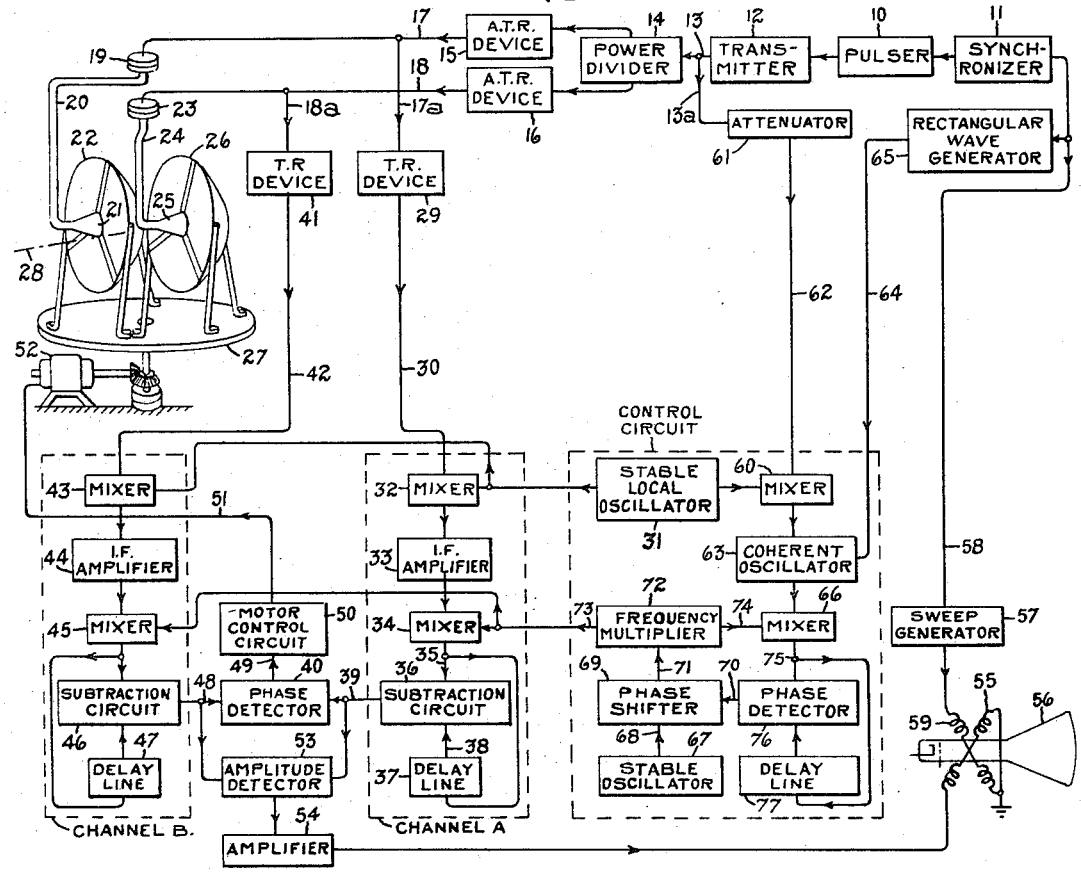
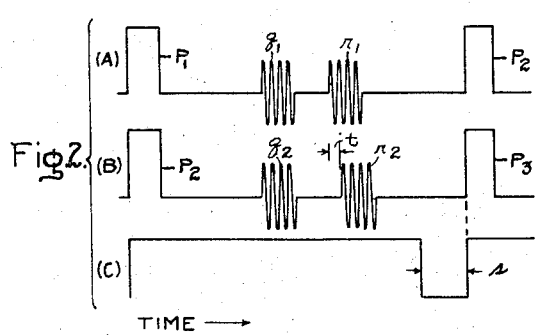
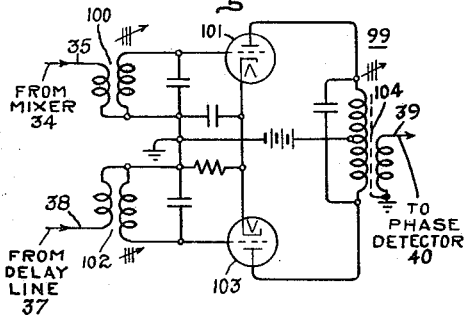
Inventor:
Richard C. Jensen,
by Charles M. Hutchins
His Attorney.

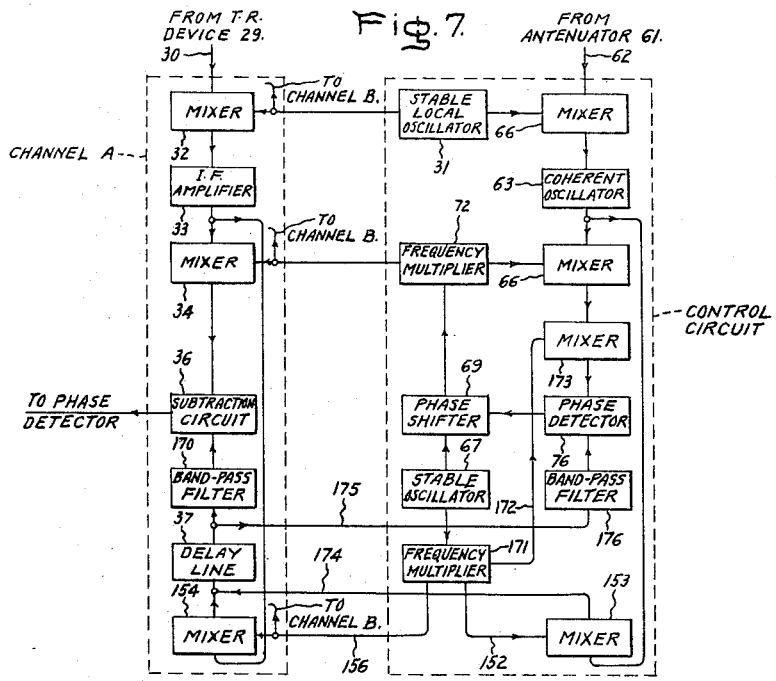
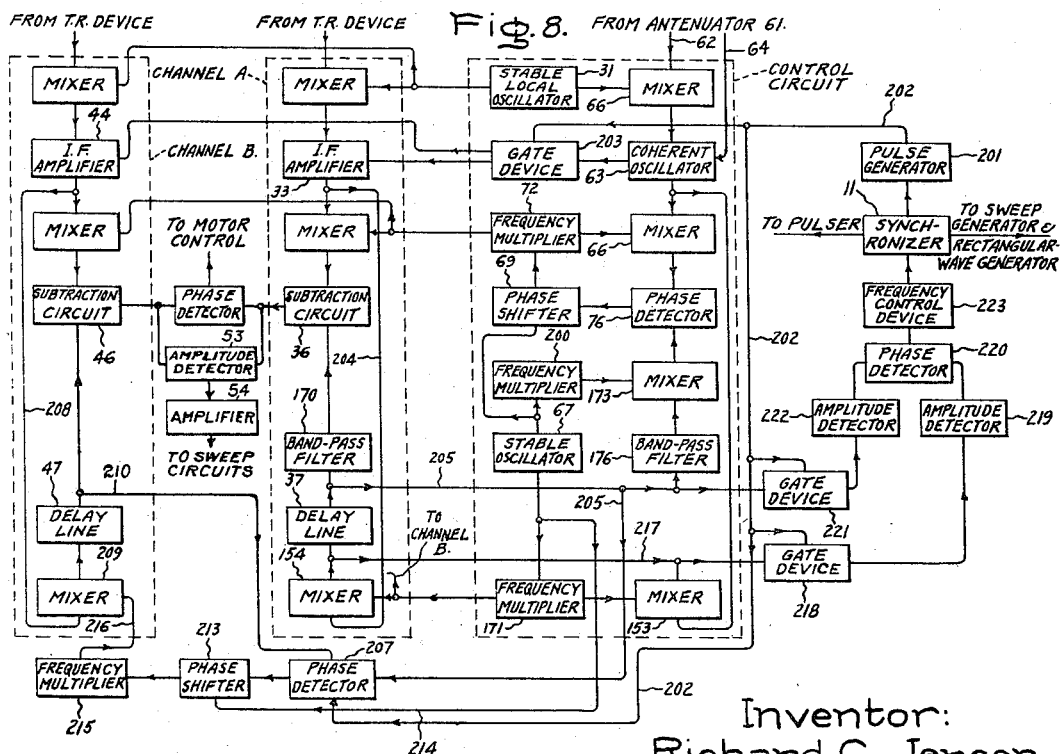

United States Patent Office 3,422,428
Patented Jan. 14, 1969

3,422,428
MOVING-TARGET-RESPONSIVE
RADAR SYSTEM
Richard C. Jensen, Baldwinsville, N.Y., assignor to General Electric Company, a corporation of New York
Filed Sept. 15, 1953, Ser. No. 380,318
U.S. Cl. 343—7                                    19 Claims
Int. Cl. G01s 9/02

My invention relates to object-locating equipment of the pulse-echo type and it has for one of its objects to provide certain improvements whereby a moving remote object may be followed despite interference caused by stationary objects.

One of the problems frequently encountered in such pulse-echo equipment arises in following or tracking a rapidly-moving object. To that end, equipment of the monopulse type has been developed in which direction information as well as range information is derived in response to each reflected pulse, as contrasted with sequential scanning systems in which several cycles of antenna scan, over many pulse periods, are necessary to determine direction.

In a phase-comparison monopulse system, wave energy is radiated into space and, after reflection by a remote object, the wave energy is intercepted by a pair of antenna elements. These elements are disposed on opposite sides of a reference plane and are constructed so as to have similarly-oriented space patterns. The antenna elements supply reflected wave energy to individual translating channels. The angular displacement of the reflecting object, relative to the reference plane, may be determined by comparing the phase of the output waves from these channels.

This type of system is generally satisfactory. However, under certain conditions, such as where a ground radar station tracks a low-flying aircraft, echo returns from ground objects at the same range as the aircraft may cause undesired interference which obscures the desired returns. This materially impairs the ability to track the aircraft and reduces the effectiveness of the system.

It is an object of this invention, therefore, to provide a novel radar system which is not subject to the foregoing deficiency.

Another object of the invention is to provide a novel monopulse radar system of the phase-comparison type which permits tracking of moving objects despite interference caused by stationary objects.

Still another object of the invention is to provide a novel radar system for deriving direction information in response to each pulse reflected from a remote object that is moving relative to the site of the system, while minimizing the effects of returns from fixed objects.

A further object of this invention is to provide a novel moving-target-responsive phase-comparison radar system which includes means for compensating undesired variations in certain circuit components that may otherwise impair the operation of the system.

A pulse-echo system in accordance with the present invention comprises means for radiating pulses of wave energy and for receiving reflections of such energy from a remote object. Reception is performed by a pair of intercepting devices that are disposed on opposite sides of a vertical reference plane and so arranged that the relative phase of reflected wave energy at these devices is dependent upon the angular displacement of the reflecting object with respect to the reference plane. Each intercepting device supplies reflected wave energy to an individual one of a pair of translating channels, each provided with means for reducing the amplitude of energy from a remote object that is stationary, while transmitting with substantially no attenuation and no change in relative phase the wave energy representative of a moving object. The outputs of these channels are compared in phase to derive direction information about a moving object, whereas the effects of returns from a fixed object are minimized.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawing in which:

FIGURE 1 is a schematic diagram, in block form, of a complete radar system embodying the present invention;

FIG. 2 is a group of waveforms useful in explaining the operation of a portion of the system shown in FIG. 1;

FIGS. 3, 4 and 5 are detailed circuit diagrams of certain elements represented in block form in FIG. 1; and FIGS. 6, 7 and 8 represent modifications of the system shown in FIG. 1.

Figure 4:
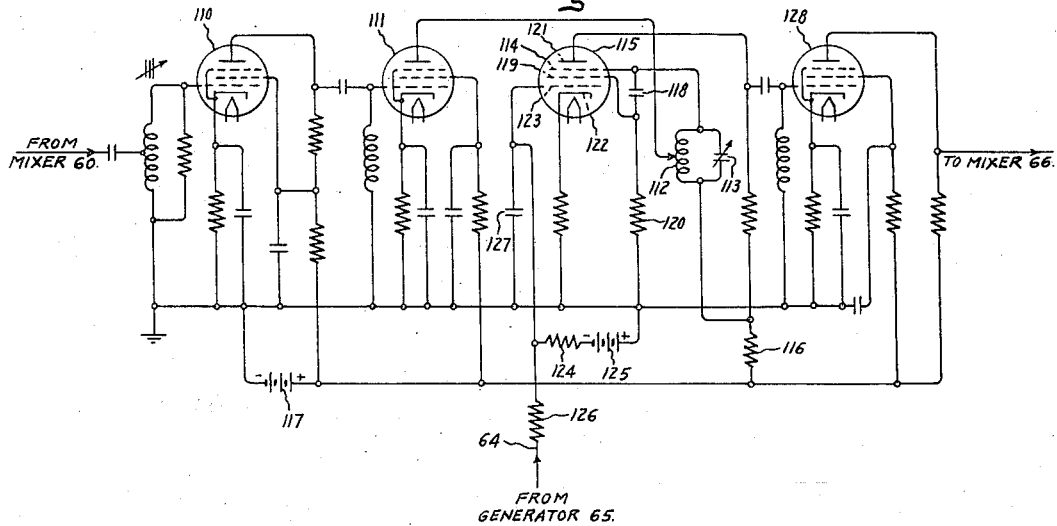

In the following description of the radar system embodying the invention, certain frequency values are assigned at various portions of the system in order to facilitate an understanding of its operation. It is to be understood, however, that such frequency assignments are employed purely by way of example and are not to be construed in any way as limiting the scope of the invention.

The radar system shown in FIG. 1 of the drawings comprises a pulser 10 which, under the control of a synchronizer 11, generates 1.0-microsecond pulses at a rate of 1200 pulses per second, for example, corresponding to a period of approximately 833 microseconds. These pulses control the operation of a transmitter 12 which supplies pulses or "bursts" of radio-frequency energy, having an illustrative frequency value of 2800 megacycles per second (mc./s.), over a lead 13 to a power divider 14. Divider 14 may, for example, comprise a T-shaped wave guide arrangement which directs one-half of the generated energy to each of a pair of anti-transmit-receive devices 15 and 16 in the same phase relation. These devices may be of any well-known construction and operate to connect power divider 14 with an individual one of wave guides 17 and 18 only during the occurrences of the pulses of radio-frequency energy.

The wave energy in guide 17 is supplied via a rotating coupling 19 and a wave guide 20 to a horn antenna 21 which projects the wave energy toward the surface of a parabolic reflector 22 from a point near its focus. Similarly, the energy traveling in wave guide 18 is supplied via a rotating coupling 23, a wave guide 24 and a horn antenna 25 to a second parabolic reflector 26.

The parabolas 22 and 26 are supported by a rotatable platform 27, on opposite sides of a vertical reference plane and face in essentially the same direction. They are so oriented that their antenna patterns overlap by a substantial amount. Thus, for transmission, portions 21–22 and 25–26 of the antenna system operate as a common antenna for radiating pulses of wave energy into space along a horizontal direction line 28 which lies in the reference plane.

These pulses travel through space and may impinge upon a remote object, from which they are reflected and thereby returned for interception by the antenna system. After reflection by the respective parabolas, wave energy is received by each of horn antennas 21 and 25.

The energy from antenna 21 is supplied over wave guide 20, coupler 19 and a branch 17a of wave guide 17, to a transmit-receive device 29. It is then supplied through a wave guide section 30 to one channel, designated A, of the receiving portion of the radar system. Device 29 may be of any well-known construction for preventing blocking and/or damage to channel A during the intervals in which pulses from transmitter 12 are supplied to the antenna system, while completing a path for wave energy from the antenna to the channel during the intervals between such pulse transmissions.

The received wave energy in wave guide 30 is combined or heterodyned with the output wave from a stable local oscillator 31, operating at a frequency of 2770 mc./s., for example, in a mixer 32 wherein there is derived a pulse-wave at an intermediate frequency of 30 mc./s. The frequency-difference wave is amplified in intermediate-frequency amplifier 33, which may be of the amplitude-limiting type, and applied to another mixer 34 wherein it is heterodyned with a 20 mc./s. wave from a circuit to be described more fully hereinafter.

The resulting pulses, having a carrier frequency of 10 mc./s. are applied over a lead 35 directly to one input circuit of a subtraction circuit 36 and to another input circuit of device 36 via an extension of lead 35, a delay line 37, and a lead 38. Device 36, which may be of any well-known construction or of the type to be described later, functions to derive the vector difference of the waves applied to its input circuits.

Delay line 37 may be of any well-known variety, such as the mercury or quartz types for imposing a time delay on the applied pulse-wave equal to the pulse period of the radar system, i.e., 833 microseconds in this illustrative example. Thus, for a fixed object, the pulse-wave resulting from the reflection of a transmitted reference pulse travels through delay line 37 and arrives at subtraction circuit 36 exactly in phase with the pulse wave that results from the reflection of the next following pulse which is applied directly to circuit 36 over lead 35.

This may be more apparent from FIG. 2 which illustrates two successive waves at circuit 36, plotted on a common time scale. In FIG. 2A, pulses $p_1$, $p_2$ and $p_3$, which produce successive "bursts" of radio-frequency energy by operating transmitter 12 are shown, together with the resulting pulse waves from mixer 34. The reflection due to pulse $p_1$ from a fixed object causes a pulse wave $q_1$, which is time-spaced from pulse $p_1$ by an amount representing the range of that object, as is well-understood. Since the reflecting object does not move relative to equipment, and since wave $q_1$ is delayed in time by delay line 37 an amount equal to the time between successive ones of the pulses $p_1$, $p_2$, $p_3$, etc., wave $q_1$ arrives at circuit 36 in time-phase with wave $q_2$ that results from the reflection due to pulse $p_2$. Waves $q_1$ and $q_2$ are vectorially subtracted in circuit 36, and because they are in phase and of equal amplitude, no output appears at lead 39.

For the case of a remote object which moves relative to the radar equipment, the output of mixer 34 due to pulse $p_1$ is represented by pulse-wave $r_1$. Since the range to the reflecting object changes from pulse-to-pulse, wave $r_1$ arrives at circuit 36 via delay line 37 at a time which is displaced by an amount $t$ from pulse-wave $r_2$ that is produced in response to pulse $p_2$. The vectorial substraction of waves $r_1$ and $r_2$ produces a pulse-type output wave which is applied over lead 39 to one input of a phase detector 40, the function of which will be described presently.

The foregoing type of operation occurs for every successive pair of pulse periods, and it is thus evident that waves due to fixed targets are effectively cancelled in channel A, whereas, as output pulse-type wave having a frequency of 10 mc./s. is supplied by channel A to phase detector 40 only in response to reflections from a moving target.

The reflected wave energy intercepted by antenna 25–26 is applied over wave guide 24, coupler 23 and a branch 18a of wave guide 18 to a transmit-receive device 41 which is similar in construction and operation to device 29. From device 41 the wave energy is supplied over a wave guide 42 to a second receiving channel, designated B.

Channel B includes a mixer 43, an intermediate-frequency amplifier 44, another mixer 45, a substraction circuit 46, and a delay line 47, which correspond to, and operate in the same manner as, elements 32, 33, 34, 36 and 37, respectively, of channel A. An output pulse-wave having a carrier frequency of 10 mc./s. is supplied to phase detector 40 by substraction circuit 46 only in response to returns from a moving target. Moreover, all fixed target information is similarly cancelled within channel B as explained above in connection with FIGS. 2A and 2B.

Although channels A and B translate the frequency of the waves arriving at antennas 21 and 25 from 2800 mc./s. to 10 mc./s., the heterodyning sources employed are common to the two channels. Thus, the output waves from these channels, supplied to phase detector 40 over leads 39 and 48, have the same relative phase as the waves intercepted by the antennas.

For the case where the reflecting object is disposed along the axis of directivity 28 of the antenna system, the returned wave energy arrives at antennas 21 and 25 in identical phase. For this condition the phase difference of the output waves of channels A and B is zero, and the output of phase detector 40 is also zero.

If the reflecting object is disposed to one side of the vertical plane defined by line 28, the returned wave energy arrives at one of antennas 21 and 25 slightly later than at the other. This effective phase shift produces a corresponding phase shift in the output waves supplied to phase detector 40. Thus, the phase detector develops a control potential which has a polarity and magnitude dependent on the direction and amount of angular displacement of the target from the reference plane. This potential is applied over lead 49 to a motor control circuit 50, of any well-known construction, which, in turn, supplies an energizing potential over a lead 51 to a driving motor 52 that mechanically drives platform 27. Displacement of platform 27 is such that direction line 28 is rotated toward the reflecting object.

Of course, if the target is initially on the other side of the reference plane, the output of phase detector 40 is of the opposite polarity, and control circuit 50 causes motor 52 to rotate platform 27 in the opposite direction. It is thus apparent that as long as the reflecting object is not intercepted by the vertical reference plane defined by line 28, an error potential is developed which causes platform 27 to rotate until the reference plane is aligned with the object and position-following is achieved.

Moreover, this phase-comparison system automatically follows moving targets only, whereas it is essentially unresponsive to returns from fixed targets which might otherwise obscure reflections from the desired target that is to be tracked in azimuth.

The direction or azimuthal position of line 28, while tracking a remote object, is a measure of the azimuth of that object. In order to derive range or distance information, the output pulses from subtraction circuits 36 and 46 are combined in an amplitude detector 53. The detected pulses are amplified in an amplifier 54 and applied to one set of deflection coils 55 of a cathode ray indicator 56. A sweep generator 57, connected to synchronizer 11 by a lead 58, supplies to the other set of deflection coils 59 a highly linear sawtooth wave. Each undulation of this sawtooth wave is initiated concomitantly with every pulse produced by transmitter 12 and has a duration corresponding to the total travel time of a pulse reflected from an object at maximum range. Thus, a linear sweep is produced on the viewing screen of device 56 and the pulses derived by detector 53 produce a transverse deflection of the sweep at a distance from its beginning corresponding to the range of the reflecting object, thereby to provide a range indication.

Although not so stated in the foregoing discussion, it has been assumed that the carrier frequency of transmitter 12 and the frequency of the local signals supplied to channels A and B are perfectly stable and that the phase delay produced by each of delay lines 37 and 47 is precisely and constantly equal to the repetition period of the system. In practice, it may be very difficult and/or expensive to provide a perfectly stable transmitter and delay lines. Hence, the system of FIG. 1 includes a control circuit for obviating difficulties which may arise as a result of instability.

The control circuit includes a mixer 60 having one input circuit to which the radio-frequency energy from transmitter 12 is supplied over a branch 13a of wave guide 13, an attenuator 61 and a wave guide 62. The combination of guide 13a and attenuator 61 may, for example, comprise a simple probe which is adjustably fixed within guide 13 so as to derive a small, predetermined amount of energy. This pulse-type wave, having a carrier frequency value of 2800 mc./s., is heterodyned in mixer 60 with the output wave of 2770 mc./s. from oscillator 31 to derive a pulsed intermediate-frequency wave of 30 mc./s. The latter wave is supplied to a coherent oscillator 63, to be described more fully hereinafter, operating at a frequency of 30 mc./s. The coherent oscillator is designed to lock, in frequency and in phase, with the waves supplied by mixer 60. Since oscillator 31 is designed to be adequately stable, frequency and/or phase shifts in transmitter 12 result in corresponding shifts in oscillator 63.

In order to achieve this coherence, oscillator 63 is biased so that it is normally inoperative. It is periodically keyed on by rectangular pulses, such as those shown in FIG. 2C, supplied over a lead 64. These pulses are produced by a generator 65 connected to synchronizer 11. It will be observed from FIG. 2C that these pulses are of positive polarity, are initiated with each of the transmitted pulses, represented in timing by pulses $p_1$–$p_2$, and have a duration equal to the pulse period of the system minus a small amount of time designated $s$, usually beyond the time at which returns from objects at maximum range occur. Thus, oscillator 63 is turned off for a short time $s$, just prior to the pulsing of transmitter 12, and is turned on with the initiation of each transmitted pulse. This assures lock-in with the 30 mc./s. pulse from mixer 60. Although mixer 60 does not supply energy after the occurrence of each of the transmitted pulses, these pulses are needed in order for heterodyning to occur. Although oscillator 63 may drift in phase, this drift is generally the same over successive pulse periods, and in the following discussion it is assumed that no drift occurs after lock-on.

The 30 mc./s. output of oscillator 63 is supplied to a mixer 66 where it is heterodyned with another wave. That wave is derived from a stable oscillator 67 which supplies radio-frequency energy at a frequency value of 1.0 mc./s. over a lead 68 to a phase-shifter 69, to be described more fully hereinafter. Phase-shifter 69 controls the phase of the controlled wave in accordance with a control potential at a lead 70, and the resulting wave is supplied over a lead 71 to a frequency multiplier 72 which may comprise any well-known form and number of stages for producing a frequency multiplication, of twenty times for example. The resulting 20-mc./s. wave, which is the one referred to in connection with mixer 34 and 35 of channels A and B, is applied to these mixers over a lead 73 and is also supplied to mixer 66 over a lead 74.

As a result of heterodyning the 30-mc./s. wave from oscillator 63 and the 20-mc./s. wave from multiplier 72, there is derived a 10-mc./s. wave in the output circuit of mixer 66 that is supplied over a lead 75 to one input circuit of a phase detector 76, and over an extension of lead 75 to a delay line 77 (which is identical to line 37). The delayed 10-mc./s. wave is supplied to the other input circuit of phase detector 76 wherein it is compared with the directly-applied wave. If there is any phase displacement between the direct and delayed waves, a control potential is derived by the phase detector and applied over lead 70 to phase shifter 69 for controlling the phase of the wave from oscillator 67. Thus, the phase of the output wave of multiplier 72, at lead 73 and 74, is varied so as to compensate for variations in the transmitter frequency and delay line changes, as will be more readily apparent from the following examples.

Let it first be assumed that the phase of the radio-frequency wave, developed in transmitter 12 and radiated by the antenna system, varies in phase from pulse-to-pulse, for example by advancing 45°. Obviously, successive reflected pulses from a fixed object are not in identical phase and the cancellation circuits in channels A and B cannot properly eliminate fixed object information, unless suitable compensation is effected by the control circuit.

Consider first a reference pulse period in which phase shifter 69 produces a quiescent value of phase shift. The frequency-multiplied wave of oscillator 67 is heterodyned in mixer 66 with the output of coherent oscillator 63 to produce a 10-mc./s. reference wave train that is supplied to delay line 77. The initial portion of the reference wave train, after being delayed, arrives at phase detector 76 at the same instant the output wave of mixer 66 advances in phase by 45° at, the beginning of the next pulse period. Phase detector 76 is supplied with waves that are phase displaced by 45° and produces a control potential which operates phase shifter 69. The phase of the wave from oscillator 67 is thereby shifted so as to effect in-phase waves at the two input circuits of phase detector 76. Thus, almost instantaneously, the output wave of multiplier 72 is retarded in phase by 45°.

This retarded wave is applied over lead 73 to mixers 34 and 45 of channels A and B. Therefore, although the carrier frequency of the reflected pulse, in the pulse period succeeding the reference period, is advanced 45° in phase, the phase of the waves from mixers 34 and 45 is unchanged and the relative phase of the waves applied to subtraction circuits 36 and 46 remains unchanged from pulse-period to pulse-period.

Each successive wave from mixer 66 to delay line 77 is advanced, compared to the previous one, and as a result, the correction progresses in increments of 45°. At 180° total shift, the error potential on lead 70 reverses polarity and correction occurs in the opposite phase direction. Thus, the control circuit continuously operates to correct phase errors.

It may similarly be shown that this compensation is achieved for random phase shifts in transmitter phase of other amounts than 45°, as well as for shifts in phase in the opposite, or retarding direction.

In practice, delay lines 37, 47 and 77 usually are positioned adjacent one another in a common container so that they are equally effected by changes in temperature. Accordingly, any change in the delay value produced by line 77 is representative of that for the other lines and the control circuit just described is operative to compensate such variations.

For example, if the length of delay line 77 increases, after an initial setting in which the output of phase detector 76 is zero, and the phase delay is increased by 45°, phase detector 76 produces an error potential which operates phase shifter 69 and the resulting output wave from multiplier 72 is retarded by 45°. Since similar changes occur in delay lines 37 and 47, the retarded wave at lead 73 combines with the waves in mixers 34 and 45 due to the reflected pulses, and subtraction circuits 36 and 46 are presented with direct and delayed waves which bear the same phase relation in successive pulse periods. In this way delay line variations are compensated and proper cancellation of fixed target information is achieved in the delay lines.

Thus, the moving-target-responsive phase-comparison radar system in accordance with the invention, includes a control circuit which compensates for variations in the phase and delay-line characteristics of the coherent oscillator and of the stable local oscillator, as well as of the transmitter.

FIG. 3 illustrates one form of circuit which may be employed to perform the function of subtraction circuit 36 in FIG. 1. A similar arrangement may be utilized for subtraction circuit 46. The output wave from mixer 34, at a frequency of 10 mc./s., is applied over lead 35 to the primary winding of a transformer 100 having a tuned secondary winding connected between the control grid and cathode of a first electron discharge device or tube 101. Similarly, the 10-mc./s. output of delay line 37 is applied to the primary winding of another transformer 102 having its tuned secondary winding connected between the control grid and cathode of another electron tube 103. The anodes of tubes 101 and 103 are connected in push-pull fashion to the tuned primary winding of an output transformer 99. Since the output should be balanced and free from stray capacitive coupling, transformer 99 is preferably provided with an electrostatic shield 104 between primary and secondary windings, as shown.

Input waves of identical phase at leads 35 and 38 are supplied to the control grids of devices 101 and 103 in the same phase relation. If these waves are of equal amplitude, the resulting anode current undulations in the primary of transformer 99 produce equal and apposite fluctuations in magnetic field and cancellation occurs. Thus, no output wave is derived in the secondary winding of the transformer and none is supplied over lead 39 to phase detector 40. This is the condition which exists in the system of FIG. 1 for reflected pulses from a fixed object.

If the input waves are displaced in phase, such as occurs in response to reflections from a moving target, cancellation may not take place and pulse trains are supplied to phase detector 40.

In FIG. 4 there is shown an exemplary circuit arrangement which may be utilized as coherent oscillator 63 in FIG. 1. The pulsed 30-mc./s. output wave from mixer 60 is applied to the input circuit of an amplifier which includes a pentode-type electron tube 110. This amplifier is coupled in cascade relation with another that includes a pentode-type electron tube 111. The amplitude output wave at the anode of device 111 is supplied to a selected portion of an inductance 112 that is parallel-resonant with a variable condenser 113 at a frequency of 30-mc./s.

One terminal of parallel-resonant circuit 112-113 is connected to the suppressor grid 114 of a pentode tube 115, and the other terminal is connected via a resistor 116 to the positive terminal of a potential source 117, the negative terminal of which is grounded. Suppressor grid 114 is connected by a condenser 118 to screen grid 119 of tube 115, in turn, connected to ground through a resistor 120.

The voltage of suppressor grid 114, with respect to screen grid 119, causes electrons that have passed through the screen grid to be returned thereto. Since the screen grid is coupled to suppressor grid 114 by condenser 118, a change in screen voltage is accompanied by a corresponding change in suppressor voltage. Therefore, a positive rise in screen grid voltage appears as a positive rise in suppressor voltage which allows more electrons to reach anode 121, thereby decreasing the current drawn by screen grid 119. Since a rise in screen voltage causes a decrease in screen current, a negative resistance is effected between screen grid 119 and its source of potential supply, and the device operates as a transitron oscillator with sustained oscillations occurring across resonant circuit 112-113.

Cathode 122 of device 115 is grounded through a cathode resistor and its control grid 123 is connected through a grid resistor 124 to the negative terminal of a bias source 125, the positive terminal of which is grounded. Source 125 provides a bias potential between cathode 122 and control grid 123 of a value more negative than that required for anode current cutoff. In the absence of applied gating pulses, the transitron oscillator is inoperative. However, positive pulses from generator 65 are applied to control grid 123 over lead 64 and a resistor 126, which together with a condenser 127 constitutes a filter for radio-frequency energy at 30 mc./s. Each of these pulses has sufficient amplitude to overcome the cutoff bias, and the transitron oscillator is excited into oscillation at the start of every pulse period of the radar system by variations in the anode current of tube 115, a portion of which flows through resistor 116.

The 30-mc./s. output is supplied to the input circuit of an amplifier which includes a pentode-type electron tube 128 which, in turn, supplies the amplified wave to mixer 66.

Figure 5:
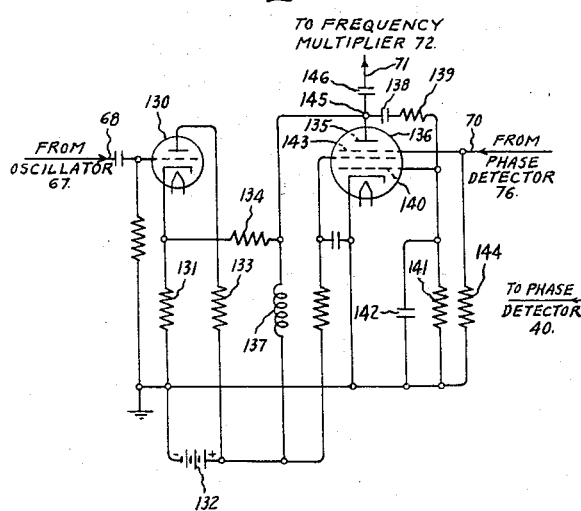

FIG. 5 illustrates a circuit which may be employed to perform the function of phase shifter 69 in FIG. 1. The output from stable oscillator 67 is supplied over lead 68 to the grid-cathode circuit of an electron tube 130. The cathode of device 130 is grounded through a cathode-load resistor 131 and its anode is connected to the positive terminal of a potential source 132 through a resistor 133 having a resistance value much smaller than that of resistor 131. Device 130 thus operates as a cathode-follower and the applied wave from oscillator 67 appears across cathode impedance 131 with no change in phase.

The output of the cathode follower is applied over a resistor 134 to anode 135 of a pentode-type electron tube 136. Anode 135 is connected to the positive terminal of source 132 through a radio-frequency choke 137, its cathode is grounded and its screen grid is connected to source 132 via a dropping resistor that is capacitively by-passed to ground. Anode 135 is connected via the series combination of a condenser 138 and a resistor 139 to control grid 140 which, in turn, is grounded through the parallel combination of a resistor 141 and a condenser 142. Suppressor grid 143 is connected to ground through a resistor 144 and to the output of phase detector 76 via lead 70. The output of the phase shifter is derived at junction 145 of resistor 134 and anode 135, and is supplied via a coupling condenser 146 and lead 71 to frequency multiplier 72.

In considering the operation of the phase shifter circuit just described, reference is first made to the junction 145. If an undulating wave is applied between point 145 and ground, a resulting undulating current flows through condenser 138, resistor 139 and the parallel combination of resistor 141 and condenser 142. Because component 142 is a capacitive reactance, the voltage developed acorss this condenser lags the current which flows through resistor 139. The voltage on condenser 142 is applied to control grid 140, and since the anode current of electron discharge device 136 varies in phase with variations in the applied control grid voltage, the anode current drawn by device 136 lags the anode voltage. Thus, the resulting current between point 145 and ground acts as if it was produced by an inductive reactance.

Because phase detector 76 is connected to suppressor grid 143, the anode current of device 136 is under the control of the phase detector output, and the magnitude of the inductive reactance between point 145 and ground is varied in accordance with the potential on lead 70. Cathode impedance 131 of device 130 thus is connected to a circuit which includes a resistance (resistor 134) connected at point 145 to an inductive reactance of controllable value. This constitutes a phase-shifting network and, thus, the 1.0-mc./s. wave from the cathode follower may be controlled in phase in accordance with the potential on lead 70 and applied over condenser 146 and lead 71 to frequency multiplier 72.

Figure 6:
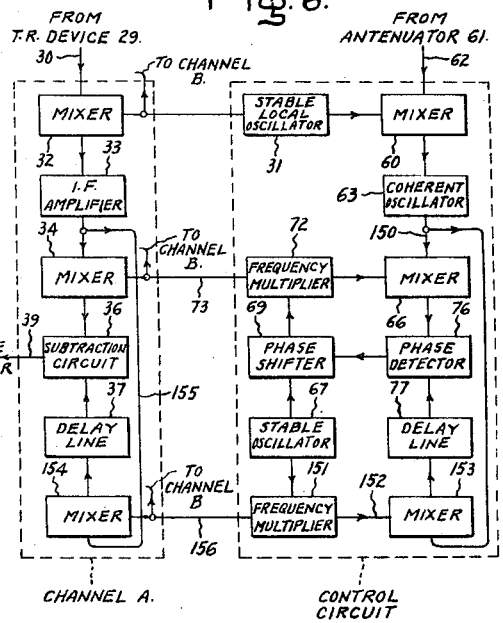

The control circuit portion of FIG. 1 provides progressive, compensating changes in phase during successive pulse periods as a result of various phase shifts in the system. This may impose an undue demand on the elements of the control circuit. The modified arrangement of FIG. 6 is designed to avoid such progressive shifting in phase by applying a wave directly to the delay line of the control circuit without correction. Although the control circuit and channel A alone are shown in FIG. 6, it is to be understood that the circuit of channel B (not shown) is identical to channel A and the remainder of the system is as represented in FIG. 1. Corresponding elements in these figures are therefore designated by the same reference characters.

In the control circuit portion of FIG. 6, the output wave of stable oscillator 31 is heterodyned in mixer 60 with the pulse-wave applied over wave guide 62, thereby to derive a 30-mc./s. wave for controlling the operation of coherent oscillator 63. The wave energy from oscillator 63 is supplied over a lead 150 to mixer 66 where it is heterodyned with the phase-controlled 20-mc./s. output of frequency multiplier 72. Stable oscillator 67, in addition to supplying oscillator via phase shifter 69 to multiplier 72, supplies its 1.0-mc./s. oscillations to a frequency multiplier 151, which may comprise a number of stages of well-known construction for producing a multiplication in frequency of twenty.

The resulting 20-mc./s. output wave is supplied over a lead 152 to one input circuit of another mixer 153, to the other input circuit of which the output of coherent oscillator 63 is applied over an extension of lead 150. The resulting 10-mc./s. wave is delayed in delay line 77 and applied to phase detector 76.

The output wave of mixer 66 is compared in phase with the wave from delay line 77 in phase detector 76 and, thus, a phase control potential appears at lead 70 for regulating phase shifter 69.

In a manner similar to the arrangement for the control circuit, the receiver channels individually include an additional mixer, represented by mixer 154 in channel A of FIG. 6. The output wave of intermediate-frequency amplifier 33 is supplied over a lead 155 to one input circuit of mixer 154 and that 30-mc./s. wave is heterodyned with the 20-mc./s. wave from multiplier 151 supplied over a lead 156 to the other input circuit of the mixer. There is thus derived a 10-mc./s. wave which is delayed in delay line 37 before application to subtraction circuit 36.

The operation of this modification of the invention may be best understood by considering an example in which the delay lines increase in length to cause an additional 45° delay after an initial adjustment of the system. Thereafter, a reference wave travels through delay line 77, and because of the assumed phase shift, is delayed in phase by an additional 45°. Thus, the direct wave from mixer 66 and the delayed wave from line 77 are phase-displaced by 45°. An error potential is supplied to phase shifter 69 and the output of multiplier 72 is immediately retarded by 45°. Accordingly, the output of mixer 34 in channel A is phased for essentially complete cancellation of fixed target information in subtraction circuit 36 in the next following pulse period.

In the third period following the reference period, the amount of delay in line 77 remains unchanged from the second, assuming that the line remains fixed at a new delay value. Since the input wave to the delay line has not been compensated, as in FIG. 1, phase detector 76 is presented with properly phased voltages, i.e., in time coincidence, representing the delayed wave of the second period and the directly-applied wave of the third period. Thus, it will be apparent that, for any fixed value of delay in line 77, a definite value of control potential exists to maintain complete phase coincidence of the voltages applied to phase detector 76. Consequently, phase shifter 69 remains at a quiescent value of phase shift and the output of multiplier 72 at lead 73 is shifted in phase to correct for an equal phase error in line 37 as in line 77. Therefore, assuming a fixed target, the output wave from mixer 34 does not shift in phase from the second period to the third and complete cancellation occurs in subtraction circuit 36.

In FIG. 7, the feature of non-progressive compensation of the type described in connection with FIG. 6 is included. In addition, the circuit includes a modification permitting the use of a single delay line for both the control circuit and channel A. Channel B (not shown), includes its own delay line.

Briefly, this is accomplished by establishing different frequency values for the waves of the control circuit and of channel A that are to be delayed before application to the single delay line. Thus, separation of the two frequencies may be effected by the use of band-pass filters.

The wave from the control circuit for application to delay line 37 of channel A has a frequency value of 14 mc./s., and the corresponding wave in channel A has a frequency of 10 mc./s. Accordingly, channel A is provided with a band-pass filter 170 which permits the 10-mc./s. carrier and a suitable sideband range of frequencies to pass with little or no attenuation from delay line 37 to subtraction circuit 36. However, the filter substantially completely attenuates 14-mc./s. frequency components from the control circuit.

The control circuit includes a frequency multiplier 171, which corresponds to multiplier 151 of FIG. 6. It multiplies the 1.0-mc./s. output of oscillator 67 and supplies a 20-mc./s. wave over lead 156 to mixer 154, a 16-mc./s. wave over lead 152 to mixer 153, and a 4.0-mc./s. wave over a lead 172 to a mixer 173.

In mixer 153, the 30-mc./s. output wave of coherent oscillator 63 is heterodyned with the 16-mc./s. wave from multiplier 171 to derive a 14-mc./s. wave that is applied over a lead 174 to delay line 37 of channel A. The delayed output is supplied via a lead 175 to a band-pass filter 176 which is designed to pass the 14-mc./s. wave with substantially no attenuation to phase detector 76, while attenuating waves of other frequency values, particularly those frequency components in a band centering about 10-mc./s. In detector 76, this 14-mc./s. wave is compared in phase with the wave of like frequency that is derived in mixer 173 by heterodyning the 4.0-mc./s. output of multiplier 171 and the 10-mc./s. wave of mixer 66.

With the exception of the use of a common delay line, the circuit of FIG. 7 operates in the same manner as the arrangement of FIG. 6 to compensate for variations in phase in the delay line and in the operating frequency of transmitter 12.

It is to be noted that while different frequencies are supplied to delay line 37 for both channel A and control circuit operation, and that although compensation is performed with respect to the control circuit frequency alone, the circuit arrangement of FIG. 7 is such that a correction for the control circuit results in suitable correction for channel A. For example, if a different arrangement is employed whereby multiplier 72 supplies different output frequencies to the mixers 34 and 66, providing, for example, a higher frequency for mixer 34, a compensation in the control circuit results in over-compensation in channel A and incomplete cancellation occurs in subtraction circuit 36. Thus, fixed target information appears in the output of channel A. If, on the other hand, the 4-mc./s. wave from multiplier 171 is obtained from a source connected to the output side of phase shifter 69, the shift in the 4-mc./s. wave becomes additive with the shift of the wave from multiplier 72. The net result is under-compensation in channel A with incomplete cancellation of fixed target information.

In the circuit modification of FIG. 8, as in the arrangement of FIG. 7, a single delay line 37 is utilized for both the control circuit and channel A. The circuit differs in that mixer 173, supplied with a 4.0-mc./s. wave from multiplier 171 in FIG. 7, is moved from the undelayed to the delayed input circuit of phase detector 76. Another frequency multiplier 200 derives from the output oscillations of stable oscillator 67 the 4.0-mc./s. wave that is supplied to mixer 173. The change in circuit position of mixer 173 removes it from the compensation loop, which includes phase shifter 69, and thereby permits the loop to operate more quickly.

The circuit of FIG. 8 also includes means for compensating for variations in the delay line 47 of channel B. It further includes a monitoring arrangement for controlling the frequency of synchronizer 11, and thereby adjusting the keying rate of the radar transmitter 11 in accordance with variations in delay line 37.

The first of these additional features is performed by an auxiliary control circuit operating in conjunction with a gating circuit that applies the output of coherent oscillator 63 to intermediate-frequency amplifiers 33 and 44 of channels A and B during selected time intervals. These intervals are determined by a pulse generator 201 that is synchronized with synchronizer 11 and supplies positive gating pulses over lead 202 to a gate device 203 during a portion of the intervals s, represented in FIG. 2c. It will be rememberd that these intervals represent the unused portions of the pulse periods.

The gate device, for example, may comprise an electron discharge amplifier that is biased to anode current cutoff and operatively conditioned in response to each pulse from generator 201. Thus, the output of oscillator 63 is applied to channels A and B during the unused intervals of the pulse periods.

In channel A, the 30-mc./s. output of amplifier 33 is fed via a lead 204 to mixer 154 wherein it is heterodyned with the 20-mc./s. wave from multiplier 171 to derive the 10-mc./s. wave that is delayed by line 37. The delayed wave is supplied over a lead 205 to one input circuit of a phase detector 207. Phase detector 207 is controlled by the pulses from generator 201 which are supplied over an extension of lead 202 and, thus, an input wave is applied to phase detector 207 only during the intervals s (FIG. 2c).

The intermediate-frequency wave of channel B is supplied over a lead 208 to a mixer 209 wherein it is heterodyned with a 20-mc./s. wave that has a phasing determined by the auxiliary control circuit constructed in accordance with this feature of the present invention. The resulting 10-mc./s. wave from mixer 209 is delayed in delay line 47 and applied over a lead 210 to another input circuit of phase detector 207, in which it is compared in phase with the delayed output of line 37. If there is any phase displacement between the delayed waves, a control potential is applied to a phase shifter 213, to which the output of oscillator 67 is applied over a lead 214. The phase-corrected wave from phase shifter 213 is supplied to a frequency multiplier 215 which derives a corrected 20-mc./s. wave that is applied to mixer 209 via a lead 216.

It may thus be seen that should delay line 47 change in length, the phase of the wave applied to mixer 209 is varied in such a manner that the circuit including line 47 is effectively compensated to bring it into correspondence with the circuit including line 37. Similarly, a change in length in line 37 is compensated by a shift in the phase of the wave applied to mixer 209.

The circuit constants of phase detector 207 are selected so that it is relatively slow-acting, compared with the pulse rate of system (1200 pulses per second). This prevents over-compensation and subsequent hunting in the correction circuit. Furthermore, phase detector 207 thereby maintains constant control of phase shifter 213 during the time intervals between the intervals s. Usually, changes in the length of lines 37 and 47 produce small and slowly-occurring phase changes compared with the pulse period of the system; hence, such slow action is entirely satisfactory and proper compensation is afforded.

The circuits of FIG. 8 thus far described compensate for extraneous, small-order variations in circuit parameters comparable with the period of the intermediate frequency of the receiver, i.e., $10^{-6}/30$ seconds. To accommodate large-order changes comparable with the system's pulse period of 833 microseconds, such as several microseconds, the delayed and undelayed sampling waves at delay line 37 are demodulated. The resulting pulses are compared in phase to derive a control potential that is employed to adjust the pulse rate of the system. To accomplish this, the undelayed wave at delay line 37 (channel A) is also supplied over a lead 217 to a gate device 218 which is operatively conditioned by the pulses from generator 201 at lead 202. This amplitude-modulated wave is applied to an amplitude detector 219 which derives the modulation or pulse components thereof for application to one input circuit of a phase detector 220.

The delayed, amplitude-modulated wave at line 37 is applied over an extension of lead 205 and another gate device 221, operated by pulses from generator 201, to an amplitude detector 222 which derives the envelope of this wave. The delayed pulses are then applied to another input circuit of phase detector 220 which compares the timing of the delayed and undelayed pulses. If synchronizer 11 varies from an initially-established operating frequency for which the delay lines have been adjusted, the delayed and undelayed pulses at phase detector 220 do not coincide in timing. As a result, a control potential is applied to a frequency control device 223 which may be of any well-known type, such as a variable reactance, coupled to the frequency-determining portion of synchronizer 11, thereby to regulate the operating frequency of the synchronizer.

Similarly, if the delay of line 37 varies from an initially-established setting in which coincidence of timing is produced, the control potential suitably alters the operating frequency of synchronizer 11. In either event, device 223, causes the operating frequency of the synchronizer to vary until coincidence of the delayed and undelayed pulses is established. Of course, since synchronizer 11 controls pulser 10, the pulse rate of the system varies and reflected pulses are suitably timed so that cancellation occurs in channels A and B for fixed targets despite undesired variations in circuit parameters.

Gate devices 218 and 221 assure that this compensation occurs only in response to the monitoring pulses that are supplied to channels A and B during intervals s. Furthermore, phase detector 220 is designed to be relatively slow-acting so that it maintains control over device 223 during the intervals between sampling pulses.

It may thus be seen that the circuit arrangement of FIG. 8 includes means for cancelling fixed target information in channels A and B, and the outputs of subtraction circuits 36 and 46 represent an accurate measurement in terms of phase of the angular departure of a moving target with respect to a vertical plane extending through direction line 28 of FIG. 1.

Although the present invention has been described in association with a phase-comparison antenna-positioning radar system, it is to be understood that the invention may be suitably employed in other environments. For example, the output of phase detector 40 in FIG. 1 may be utilized for resolution improvement in a plan-position indicator arrangement such as described in the copending application of Walter Hausz which was filed on Oct. 16, 1951, bearing the Ser. No. 251,582, now Patent No. 3,317,910 and assigned to the present assignee.

In the system described in that application, the output of phase detector 40 deflects the electron beam transversely relative to the radial sweep so that objects disposed in the vertical plane intercepting direction line 28 produce more intense indications on the viewing screen of the plan-position indicator than objects disposed to either side of the reference plane, but within the main lobe of the antenna system. Of course, this type of operation occurs for moving targets alone since fixed target information is cancelled in channels A and B.

While particular embodiments of the present invention have been shown and described, it will be obvious to those skilled in the art that changes and modificatoins may be made without departing from this invention in its broader aspects, and, therefore, the aim in the appended claims is to cover all such changes and modifications as fall within the true spirit and scope of the invention.

What I claim as new and desire to secure by Letters Patent of the United States is:

1. An object-detection system comprising means for radiating wave energy into space and for intercepting reflections from a remote object, said means including a pair of wave-intercepting devices disposed on opposite sides of a reference plane to derive a pair of output waves having a relative phasing representing the angular displacement of said object with respect to said reference plane, means for deriving a control effect dependent upon the angular displacement of only objects having a radial component of velocity with respect to said intercepting devices comprising a pair of translating channels, each coupled to one of said devices, for translating said output waves with substantially no change in relative phasing, each of said channels including means for translating waves representing a remote object having a radial component of velocity with respect to said intercepting devices, while materially reducing the amplitude of waves representing a fixed object, and means for utilizing the waves translated by said channels to derive a control effect dependent upon said relative phasing.

2. An object-detection system comprising means for radiating wave energy of a given frequency value into space and for intercepting reflections from a remote object, said means including a pair of wave-intercepting devices disposed on opposite sides of a reference plane to derive a pair of output waves of said given frequency having a relative phasing representing the angular displacemeent of said objects with respect to said reference plane, means for deriving a control effect dependent upon the angular displacement of only objects having a radial component of velocity with respect to said intercepting devices comprising a pair of translating channels, each coupled to one of said devices, including means for transposing said output waves to a different, intermediate-frequency value with substantially no change in relative phasing, each of said channels further including means for translating waves of said intermediate-frequency value representing a remote object having a radial component of velocity with respect to said intercepting devices, while materially reducing the amplitude of waves of said intermediate-frequency value representing a fixed object, and means for utilizing the waves of said intermediate-frequency value translated by said channels to derive a control effect dependent upon said relative phasing.

3. An object-detection system comprising means for radiating into space wave energy of a given frequency value, pulse modulated at a predetermined repetition frequency, and for intercepting reflections from a remote object to derive a pair of pulse-type output waves of said given frequency having a relative phasing representing the angular displacement of said object with respect to a reference plane, means for deriving a control effect dependent upon the angular displacement of only remote objects moving with respect to said reference plane comprising a pair of translating channels, each including means for transposing said output waves to a different, intermediate-frequency value with substantially no change in relative phasing, a delay device for imposing a time delay upon an applied intermediate-frequency wave of an amount substantially equal to the reciprocal value of said repetition frequency, and a subtraction circuit supplied with delayed and undelayed intermediate-frequency waves for translating waves of said intermediate-frequency value representing a moving remote object while materially reducing the amplitude of waves of said intermediate-frequency value representing a fixed object, and means for utilizing the waves of said intermediate-frequency value translated by said channels to derive a control effect dependent upon said relative phasing.

4. An object-detection system comprising a source of pulses of wave energy having a given frequency value, means for radiating said pulses into space and for intercepting reflections from a remote object to derive a pair of pulsed waves at said frequency value having a relative phasing representing the angular displacement of said object with respect to a reference plane, means for deriving oscillations having a frequency value other than said given value, but coherent in phase therewith, a pair of translating channels, each including means supplied with one of said pair of pulsed waves and said oscillations for deriving pulsed waves of an intermediate-frequency value, cancellation means included in each channel and operative in response to successive intermediate-frequency pulses for reducing the amplitude of waves representing a fixed object, means coupled to said cancellation means of said pair of channels for deriving a control effect dependent upon the relative phasing of intermediate-frequency wave pulses representing a moving object, and a control circuit for regulating the phase of said oscillations in accordance with inherent phase variations of said cancellation means and of said wave energy supplied by said source.

5. In combination, a source of wave energy of a given frequency value occurring during relatively short intervals, each defining the inception of one of successive operating periods of substantially equal time duration, means for radiating said wave energy into space and for intercepting reflecting pulses thereof from a remote object, frequency-transposing means supplied with wave energy intercepted by said first-mentioned means, including a generator for producing continuous oscillations having phase coherence with said wave energy of said source, for deriving wave energy of an intermediate-frequency value, means for comparing the phasing of said last-mentioned wave energy occurring during successive ones of said operating periods to derive an output potential substantially only in response to a predetermined phase relationship, and means for utilizing said output potential.

6. In combination, means for radiating into space generated wave energy of a given frequency value occurring in pulses, each defining the inception of one of successive operating periods of substantially equal time duration and for intercepting reflections from a remote object; a control circuit including an oscillation generator for producing wave energy coherent in phase with said generated wave energy, a source of local wave energy, a frequency multiplier coupled to said source for deriving wave energy having a predetermined frequency multiple relationship with respect to said local wave energy, a phase shifter interposed between said source and said multiplier and having an input circuit for phase control, means for combining the output wave energies of said oscillation generator and of said multiplier to derive wave energy of an intermediate-frequency value, means for comparing said last-mentioned wave energy occurring during successive pairs of said operating periods to derive a control potential representing a variation in phase therebetween, and means for applying said control potential to said input circuit of said phase shifter thereby to adjust the phase of said wave energy from said multiplier, and a translating channel supplied with said reflections of said first-mentioned wave energy and wave energy from said multiplier to derive wave energy of an intermediate-frequency value having essentially identical phasing from one of said periods to the next for a fixed remote object.

7. In combination with a source of wave energy of a given frequency value, a first generator for producing first oscillations coherent in phase with said wave energy, a second generator for producing second oscillations, a frequency multiplier coupled to said second generator for deriving wave energy having a predetermined frequency multiple relationship with respect to said second oscillations, a phase shifter interposed between said second generator and said multiplier and having an input circuit for phase control, means for combining said first oscillations and said wave energy from said multiplier to derive additional wave energy of an intermediate-frequency value, means for comparing successive samples of said additional wave energy to derive a control potential representing variations in phase therebetween, and means for applying said control potential to said input circuit of said phase shifter, thereby to adjust the phase of said wave energy derived by said multiplier.

8. In combination with a source of wave energy of a given frequency value, a first generator for producing first oscillations coherent in phase with said wave energy, a second generator for producing second oscillations, a first frequency multiplier coupled to said second generator for deriving wave energy having a predetermined frequency value of fixed frequency multiple relationship with respect to said second oscillations, a phase shifter interposed between said second generator and said first multiplier and having an input circuit for phase control, a second frequency multiplier coupled to said second generator for deriving wave energy having a frequency value equal to said predetermined value, means for combining said first oscillations with said wave energies from said first and second multipliers to derive a pair of wave energies of an intermediate-frequency value, means for comparing said last-mentioned wave energies to derive a control potential representing variations in phase therebetween, and means for applying said control potential to said input circuit of said phase shifter thereby to adjust the phase of said wave energy derived by said first multiplier.

9. In combination, means for radiating first wave energy of a given frequency value occurring in pulses time-spaced by substantially equal intervals and for intercepting wave reflections from a remote object, a delay device for imposing a time delay on applied wave energy substantially equally to one of said intervals, a control circuit supplied with said first wave energy and comprising means for deriving second wave energy of a first intermediate-frequency value phase-coherent with said first wave energy and means including said delay device for deriving third wave energy having a phase representing the relative phasing of trains of said second wave occurring during successive intervals between said pulses, and a translating channel comprising combining means supplied with said wave reflections and said third wave energy to derive fourth wave energy of an intermediate-frequency value different from that of said second wave energy, and means including said delay device for deriving an output potential representing the relative phasing of successive trains of said fourth wave occurring during successive intervals between said pulses, and means for utilizing said output potential.

10. In combination, a source of wave energy of a given frequency value occurring in time-spaced pulses, means for radiating said wave energy and for intercepting reflected waves from a remote object, a translating channel supplied with said reflected waves and comprising cancellation means operative in response to reflected waves occurring during successive ones of the intervals between said pulses for reducing the amplitude of waves representing a fixed object while providing output waves representing a moving object, means for applying monitoring pulses of wave energy to said channel during successive intervals of relatively short duration, each occurring immediately prior to one of said pulses, means responsive to said monitoring wave energy in said cancellation means for deriving a control potential representing the phase relationship of said monitoring pulses occurring during successive ones of the intervals between said time-spaced pulses, and means responsive to said control potential for adjusting the repetition frequency of said time-spaced pulses.

11. In combination, means for radiating pulses of wave energy into space and for intercepting wave reflections thereof from a remote object to derive a pair of pulse-type output waves having a relative phasing representing the angular displacement of said object with respect to a reference plane, a pair of translating channels, each including means for utilizing local oscillations to transpose said output waves to an intermediate-frequency value and cancellation means for reducing the amplitude of waves representing a fixed object while providing a wave of an intermediate-frequency value in response to reflections from a moving object, the relative phase of said last-mentioned waves of said channels corresponding to said relative phasing, means for applying monitoring pulses of wave energy to said channels in like phase during an unused interval prior to the occurrence of each of said pulses of wave energy, means coupled to said cancellation means of each of said translating channels and responsive to said monitoring pulses translated by said cancellation means for deriving a control potential representing a variation in phase therebetween, and means for utilizing said control potential to adjust the phase of said local oscillations supplied to one of said channels.

12. An object detection system comprising means for transmitting wave energy towards remote objects and for receiving said transmitted wave energy upon retransmission from said remote objects, said means comprising at least one pair of wave energy intercepting devices disposed effecively on opposite sides of a reference plane to derive a pair of output waves having a relative signal characteristic representing the angular displacement of said object with respect to said reference plane, means for deriving a control effect dependent upon the angular displacement of only moving objects with respect to said reference plane comprising a pair of translating channels, each coupled to one of said devices, for translating said output waves with substantially no change in relative signal characteristic, each of said channels comprising means for translating waves representing a remote object moving with respect to said intercepting devices, while materially reducing the amplitude of waves representing a fixed object, and means for utilizing the waves translated by said channels to derive a control effect dependent upon said relative signal characteristic.

13. An object detection system comprising means for transmitting pulsed energy towards remote objects and for receiving said transmitted pulsed energy upon retransmission from said remote objects, said means comprising at least one pair of energy intercepting devices disposed effectively on opposite sides of a reference plane to derive a pair of output signals having a relative signal characteristic representing the angular displacement of said object with respect to said reference plane, means for deriving a control effect dependent upon the angular displacement of only moving objects with respect to said reference plane comprising a pair of translating channels, each coupled to one of said devices, for translating said output signals with substantially no change in relative signal characteristic, each of said channels comprising means for translating signals representing a remote object moving with respect to said intercepting devices, while materially reducing the amplitude of waves representing a fixed object, and means for utilizing the signals translated by said channels to derive a control effect dependent upon said relative signal characteristic.

14. An object detection system comprising means for transmitting wave energy towards remote objects and for receiving said transmitted wave energy upon reflection from said remote objects, said means comprising at least one pair of wave energy intercepting devices disposed effectively on opposite sides of a reference plane to derive a pair of output waves having a relative signal characteristic representing the angular displacement of said object with respect to said reference plane, means for controlling the directivity of said devices and reference plane in accordance with the angular displacement of only objects moving with respect to said reference plane comprising a pair of translating channels, each coupled to one of said devices, for translating said output waves with substantially no change in relative signal characteristic, each of said channels comprising means for translating waves representing a remote object moving with respect to said intercepting devices, while materially reducing the amplitude of waves representing a fixed object, and means responsive to the waves translated by said channels to control the directivity of said devices and reference plane in accordance with said relative signal characteristic.

15. In combination, means for recurrently transmitting pulses of radiant energy of a first carrier frequency, the starting phase of said first carrier frequency pulses being subject to change from pulse to pulse recurrence period, means for receiving echoes of said pulses of said first carrier frequency returned from a remote object, a source of second stable oscillations, means for mixing said received echoes and said second stable oscillations to derive echo signals at a third carrier frequency, means for mixing a portion of said transmitted pulses with said second stable oscillations to derive control oscillations at said third carrier frequency, a coherent oscillator responsive to said reference oscillations to provide coherent oscillations at said third carrier frequency having a phase synchronized with the phase of said first carrier frequency pulses, means for transforming said coherent oscillations to reference oscillations of a fourth carrier frequency having a phase synchronized with the phase of said first carrier frequency transmitted pulses, means for mixing said control signals with said echoes at said third carrier frequency to provide mixed signals at a fifth carrier frequency, a time delay circuit responsive to an applied signal to provide such signal with a time delay corresponding to the time between recurrent transmitted pulses, means for applying said mixed signals to said time delay circuit to provide time delayed mixed signals at said fifth carrier frequency, means for differentially combining said delayed and undelayed signals at said fifth carrier frequency to provide resultant signals at said fifth carrier frequency, and means for utilizing said resultant signals.

16. In combination, means for recurrently transmitting pulses of radiant energy at a radio frequency, the starting phase of successive radio frequency pulses being subject to change, means for receiving echoes of said transmitted pulses at said radio frequency returned from remote objects, means responsive to said transmitted pulses to provide coherent oscillations at a first intermediate frequency having a starting phase corresponding to the starting phase of successively transmitted radio frequency pulses, means responsive to said received echoes to provide echoes at said first intermediate frequency, means for transforming said coherent oscillations to reference oscillations at a second intermediate frequency while retaining the phase information contained in said coherent oscillations, means for mixing said reference oscillations with said echoes of said first intermediate frequency to derive mixed oscillations at a third carrier frequency, a time delay circuit responsive to an applied signal to provide such signal with a time delay corresponding to the time between recurrent transmitted pulses, means for applying said mixed oscillations at said third frequency to said time delay circuit to provide time delayed mixed third frequency oscillations, means for differentially combining said delayed and undelayed mixed third frequency oscillations to provide resultant oscillations at said third frequency, and means for utilizing said resultant oscillations.

17. In combination, means for transmitting pulses of radiant energy at a radio frequency, means for receiving echoes of said transmitted pulses at said radio frequency returned from a remote object in two differently directive reception patterns to provide a pair of output waves at said radio frequency having a relative phasing representing the angular position of said object with respect to said receiving means, means responsive to said transmitted pulses to provide coherent oscillations at a first intermediate frequency having a starting phase synchronized with the starting phase of successively transmitted radio frequency pulses, means responsive to each of said pair of output waves to provide a respective output wave at a first intermediate frequency, means for transforming said coherent oscillations to reference oscillations at a second intermediate frequency while retaining the phase information contained in said coherent oscillations, means for mixing said reference oscillations with each of said output waves at a first intermediate frequency to derive a respective mixed oscillation at a third carrier frequency, a pair of time delay circuits each responsive to an applied signal to provide such signal with a time delay corresponding to the time between recurrent transmitted pulses, means for applying each of said mixed oscillations at said third frequency to a respective one of said delay circuits to provide respective time delayed mixed third frequency oscillations, means for differentially combining each of said delayed mixed third frequency oscillations with its corresponding undelayed mixed third frequency oscillations to provide respective resultant signals at said third frequency, and means responsive to the relative phase of said respective resultant signals to vary the directivity of said reception patterns.

18. In combination, a source of recurrent trigger signals, means responsive to each of said trigger signals for transmitting a corresponding pulse of wave energy toward a remote object, means for receiving echoes of said transmitted pulses returned from said remote object, a time delay circuit responsive to an applied signal to provide said signal with a given time delay, means for generating coherent oscillations of a first carrier frequency having a phase synchronized with the phase of the wave energy of each of said transmitted pulses, means responsive to said coherent oscillations for generating control oscillations of a second carrier frequency having a phase synchronized with the phase of the wave energy of each of said transmitted pulses, means for transforming each of said received echoes to echoes at said first carrier frequency, means for mixing said echoes at said first carrier frequency with said control oscillations to provide mixed oscillations at a third carrier frequency, means for applying said mixed oscillations to said time delay circuit to provide time delayed mixed oscillations, means for differentially combining said delayed and undelayed mixed oscillations to provide resultant carrier frequency oscillations, means for utilizing said resultant oscillations, said control oscillations generating means comprising means for compensating for changes in the delay time of said delay circuit and the recurrence rate of said trigger signals comprising means responsive to such changes for varying the phase of said control oscillations accordingly.

19. In a radio system, a transmitter for recurrently transmitting wave energy toward a movable reflecting object located along a given course, means to detect deviations of said object from said course comprising a first receiver located on one side of said course and a second receiver located on the other side of said course, said receivers being differently directive and responsive to transmitted energy reflected from said object to yield a first and second carrier frequency signal in a respective first and second channel having a relative phase characteristic corresponding to the position of the object with respect to said course, a source of third carrier frequency oscillations having a phase synchronized with the phase of said transmitted wave energy, means responsive to the relative phase of third carrier frequency oscillations occuring in two periods of time corresponding to two successive transmitted wave energy recurrence periods for providing fourth carrier frequency oscillations having a phase synchronized with the phase of said transmitted wave energy and the recurrence rate of said energy transmissions, and means for separately mixing said fourth carrier frequency oscillations with said first and second carrier frequency signals to yield separate fifth and sixth carrier frequency signals, means for separately, differentially combining successively received fifth and sixth signals to derive respective seventh and eighth carrier frequency signals, means responsive to the relative phase of said seventh and eighth signals to provide a resultant signal, and means for utilizing said resultant signal.

References Cited

UNITED STATES PATENTS

| | | | |
|---|---|---|---|
| 2,467,361 | 4/1949 | Blewett | 343—11 X |
| 2,510,692 | 6/1950 | Goddard | 343—16 |
| 2,572,127 | 10/1951 | Field et al. | 343—11 |
| 2,593,071 | 4/1952 | Sunstein et al. | 343—7.7 |
| 2,639,420 | 5/1953 | Watt | 343—9 |
| 2,659,080 | 11/1953 | Benfield | 343—7.7 |
| 2,730,711 | 1/1956 | Varela | 343—7.7 |
| 2,776,425 | 1/1957 | Altman | 343—7.7 |

CHARLES L. WHITHAM, *Primary Examiner.*

R. D. BENNETT, *Assistant Examiner.*

U.S. Cl. X.R.

343—7.4, 7.7, 11, 16